April 15, 1969        W. J. TABOR        3,438,692

BIREFRINGENT DEVICE FOR FORMING MULTIPLE IMAGES

Filed March 8, 1965        Sheet 1 of 2

INVENTOR
W. J. TABOR
BY Herbert M. Shapiro
ATTORNEY

VERTICAL DEFLECTION

DEFLECTION AT 45° ORIENTATION

VERTICAL DEFLECTION

United States Patent Office 3,438,692
Patented Apr. 15, 1969

3,438,692
BIREFRINGENT DEVICE FOR FORMING
MULTIPLE IMAGES
William J. Tabor, Murray Hill, N.J., assignor to Bell
Telephone Laboratories, Incorporated, New York, N.Y.,
a corporation of New York
Filed Mar. 8, 1965, Ser. No. 437,770
Int. Cl. G02f 1/24; G02b 5/30, 27/28
U.S. Cl. 350—157                               11 Claims

ABSTRACT OF THE DISCLOSURE

A plurality of birefringent crystals are arranged in fixed orientations with respect to one another along an optical path. The arrangement functions as a fly's-eye lens for monochromatic inputs thereto. An arrangement including polarization rotators between adjacent crystals is also described.

---

This invention relates to devices for propagating electromagnetic wave energy, typically visible and ultraviolet light, and, more particularly, to such devices which simultaneously form a plurality of images from a single object.

Multifaceted lenses known alternatively as reticular lenses or, more descriptively, as fly's-eye lenses are known to produce multiple images from a single object. Such lenses, useful for example, in semiconductor device fabrication as shown in the I.B.M. Journal of Research and Development, volume 7, No. 2, April 1963, pp. 146 et seq., are difficult to make free from defects. Consequently, defect free reticular lenses are costly. Moreover, such lenses are characterized by distortion due primarily to the variation in image distance from the optic axis and also to a general inability to provide distortion free images with a lens of one index of refraction for light incident thereto from different angles.

An object of this invention is a simple and relatively inexpensive device for producing multiple images from a single object.

In accordance with this invention, the old and venerable laboratory procedure of Huygens for demonstrating polarization in calcite is turned to account. In that procedure the disposition of light by a first crystal of calcite is analyzed by observing the output thereof through a rotating second crystal. As the second crystal is rotated, an orientation therefor is reached at which a single light beam appears as four. An account of this experiment is given in Jenkins and White, "Fundamentals of Optics," Third Edition, McGraw-Hill Book Company, Inc., 1957, at page 499.

Applicant builds upon this basic procedure to provide a practical and relatively inexpensive multicrystal device wherein a multitude of substantially distortion-free images are projected on an image plan. Specifically, in accordance with one embodiment of this invention, a plurality of Wollaston prisms are oriented such that light passing through the prisms is deflected equally by each prism through two different angles. For $n$ Wollaston prisms, light from each object is deflected through $2^n$ different angles. An ordinary converging lens focuses the output light to $2^n$ discrete images substantially free of distortion and of like intensity.

Accordingly, a feature of this invention is a device including a plurality of Wollaston prisms each in a fixed orientation with respect to the others to deflect light incident thereto equally through two different angles.

Although the invention is disclosed in terms of Wollaston prisms, it is to be understood that other birefringent crystals such as, for example, simple calcite crystals, or complex Rochon and Senarmont prisms may be used.

The foregoing and further objects and features of this invention will be understood more fully from the following detailed description rendered in conjunction with the accompanying drawing, wherein.

Figure 1:
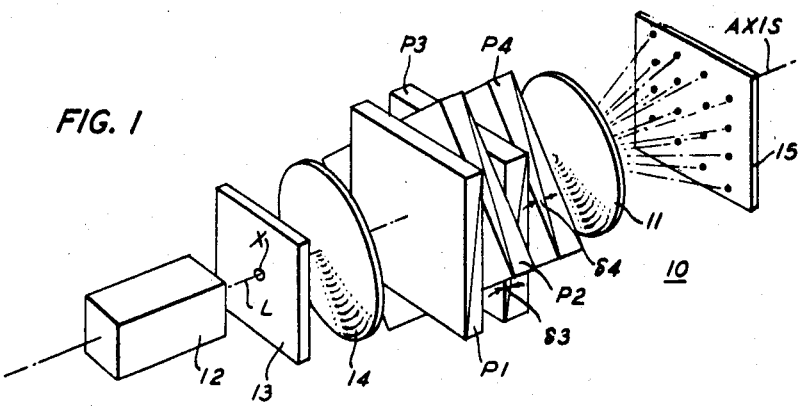
FIG. 1 is a schematic representation of a multiprism device in accordance with this invention.
Figure 5:
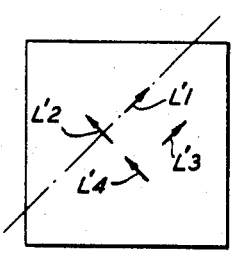
Figure 6:
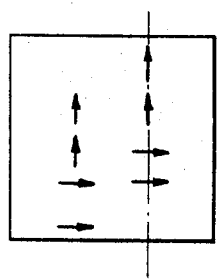
Figure 7:
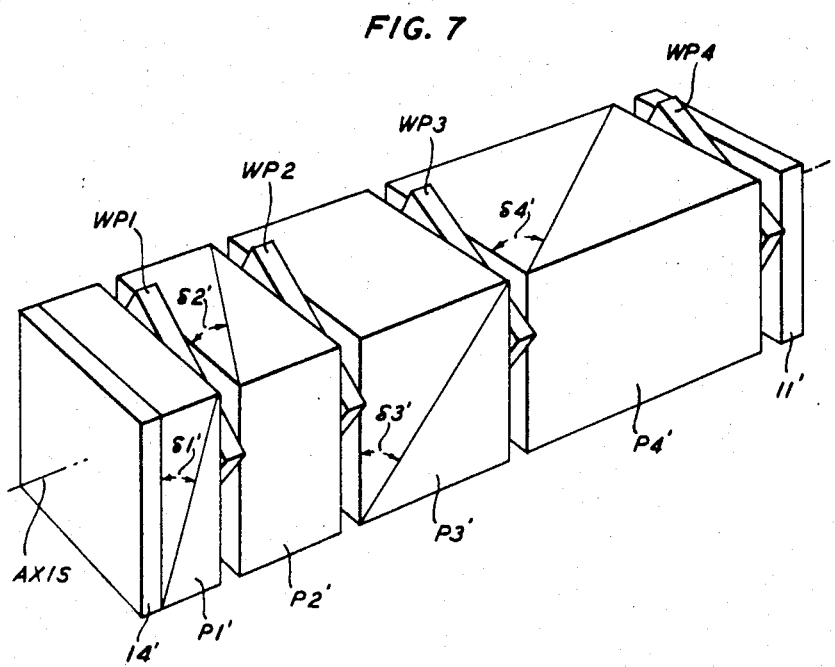

FIGS. 3, 4, 5, and 6 are enlarged end-on views illustrating the outputs of the device of FIG. 1 at the various stages thereof; and FIG. 7 is a schematic representation of a second multiprism device in accordance with this invention.

Specifically, FIG. 1 illustrates a multiprism device 10 in accordance with this invention. The device includes, illustratively, four successively thicker Wollaston prisms P1, P2, P3 and P4 and a lens 11 positioned adjacent prism P4. Adjacent prisms are oriented at 45 degrees with respect to one another as is explained hereinafter and cemented together by a material having a suitable index of refraction. In FIG. 1, the prisms are shown having square cross sections to emphasize this orientation of the crystals; the prisms, of course, may be circular in cross section. A source of light 12 is shown adjacent prism P1 separated therefrom by a plate 13, having an aperture X therein, and a lens 14. An imaginary image plane 15 is shown adjacent lens 11. In practice, a photographic image is placed at aperture X to provide the object.

Figure 2:
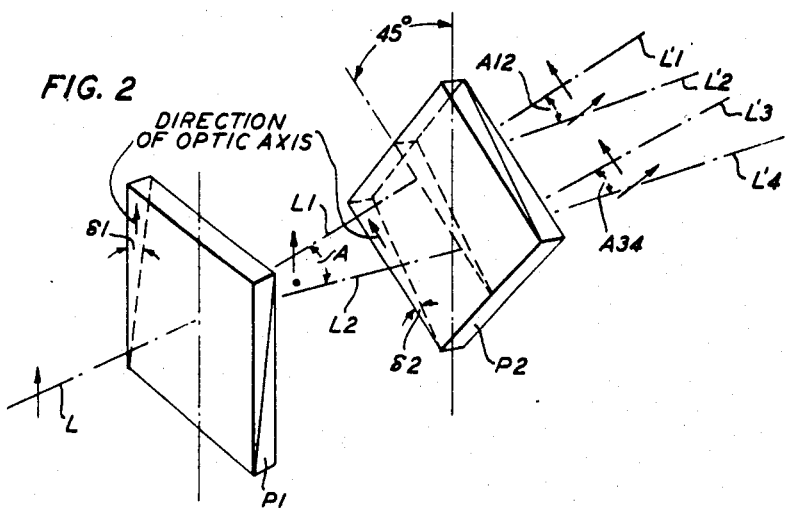
FIG. 2 is an exploded schematic representation of two adjacent prisms of the device of FIG. 1, illustrating the internal structure of those prisms and the formation of plural beams thereby.

In operation, source 12 directs a beam of light L through aperture X and lens 14. Aperture X defines the image; lens 14 forms light into parallel rays. Source 12 is controlled by well known external circuitry not shown. In this connection, source 12 may be, for example, an ordinary light bulb (including an appropriate filter as is discussed hereinafter), a sodium arc lamp, or an optical maser. Both polarized and unpolarized light may be used. If polarized light is desired, a polarizer (not shown) may be positioned between plate 13 and lens 14. It is assumed for this description that the beam L is not polarized and that the beam is in a direction of propagation normal to the surface of Wollaston prism P1. In this connection, a Wollaston prism is comprised of first and second birefringent crystals cemented together with, for example, Canada balsam or synthetic polymerizers in a manner to provide double refraction of a beam incident to the surface of the first crystal and traveling perpendicular to the optic axis of that crystal. Hereinafter, the optic axis of a first crystal of a Wollaston prism is referred to as the optic axis of the corresponding prism. The Wollaston prism and its operation in this manner are described in Jenkins and White, "Fundamentals of Optics," page 504. The double refraction of the beam directed at prism P1 provides two output beams of equal intensity having polarization directions orthogonal to one another. Those two output beams have directions of propagation at an angle (of deflection) A to one another. Angle A is aligned with the optic axis of the prism and is shown in FIG. 2 adjacent prism P1.

For unpolarized light, the optic axis of prism P1 need assume no special orientation. For illustrative purposes, the optic axis of prism P1 is assumed to be vertical such that the interface between the first and second crystals constituting that prism forms an "apex" angle $\delta 1$ with the lower end of the front (incident) face of that prism as viewed in FIG. 2. Prism P1 divides the incident light into two polarized components directed along two different paths (to two different angles). The two directions of polarization are represented by the arrow and dot adjacent prism P1 in FIG. 2 and by the orthogonal arrows in FIG. 4. It is to be understood that these arrows merely represent the axis of vibration of the light rather than a particular direction. The two paths (angles) are represented by broken lines designated L1 and L2 as shown in FIG. 2 and may be seen there to be displaced along the vertical forming an angle A aligned with the optic axis of the prism.

Now two distinct beams are incident to prism P2. Prism P2 is, illustratively, a Wollaston prism as is prism P1, the thickness $t(t=f\delta)$ thereof differing from that of the latter as is explained hereinafter. The optic axis of prism P2 is oriented (rotated counterclockwise as viewed from left to right in FIG. 2) 45 degrees with respect to prism P1 as is indicated in FIGS. 1 and 2. Such an orientation causes each beam incident to prism P2 to be divided into two distinct beams with opposite (orthogonal) polarization directions, the angles of deflection A12 and A34 therebetween being at 45 degrees orientation with respect to that between the incident beams. That is to say, the angle of deflection between each pair of output beams is aligned with the optic axis of the prism P2. Whereas the directions of polarization of the two beams from prism P1 were vertical and horizontal as shown by the arrows in FIG. 4, the polarization directions of the beams from prism P2, although orthogonal to one another, are rotated 45 degrees (counterclockwise as viewed from left to right in FIG. 2) as indicated by the arrows adjacent prism P2 in FIG. 2. In this connection, the arrows shown in FIGS. 3, 4, 5, and 6 are imaginary, the light in each instance being converted to the form shown in the figures with imaginary lenses like lens 11. It is noted that each incident beam produces a pair of beams with orthogonal polarization directions; one polarization direction is along the optic axis, the other is orthogonal. For incident beams L1 and L2, prism P2 provides output beams L'1 and L'2, and L'3 and L'4, respectively. An end-on view (looking *right to left* in FIGS. 1 or 2) of the polarization directions is shown by the arrows in FIG. 5.

The third prism P3 is, illustratively, like prism P1 and oriented in the same direction, that is, with the optic axis thereof rotated clockwise 45 degrees with respect to prism P2. In this connection, prism P3 includes an angle δ3 corresponding to the angle δ1 of prism P1 but greater than the latter as is explained hereinafter. Once again, each beam incident to prism P3 is divided into two with opposite directions of polarization each at 45 degrees with respect to the polarization direction of the incident beam. A vertical orientation of the optic axis of prism P3 causes each beam to provide two vertically displaced beams in a manner described in connection with FIG. 4. Accordingly, the four beams (see FIG. 5) incident to prism P3 each produce two beams vertically displaced from one another and having orthogonal polarization directions 45 degrees with respect to the incident beams. The end-on view of the eight resulting beams is shown in FIG. 6.

Figure 3:
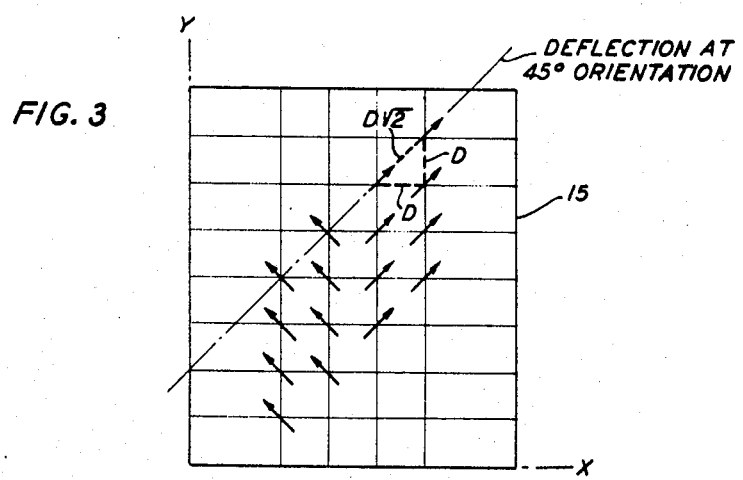

These eight beams are incident upon prism P4. Prism P4 is oriented as is prism P2, that is, at an angle (rotated counterclockwise as viewed from left to right in FIG. 1) 45 degrees with respect to prism P3. Moreover, prism P4 has an angle δ4 (see FIG. 1) differing from the like angle in the next lower order prism as is discussed hereinafter. Once again, these light beams are divided two for one; deflected by prism P4 similarly along the 45 degree orientation described in connection with prism P2 and FIG. 5. An end-on view of the sixteen resulting beams is shown in FIG. 3. It is emphasized that the view of the image plane 15 as shown in FIG. 3 is an end-on view (from right to left as viewed in FIG. 1) opposite to the view shown in FIG. 1.

Figure 4:
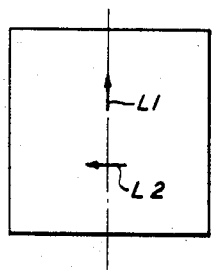

The beams as shown in FIG. 3 are aligned in rows and columns, the rows following a 45 degree angle with respect to superimposed X and Y axes. In this pattern, the direction of polarization of the beams, corresponding to the two columns on the right as viewed in the figure, are upward and to the right as shown by the arrows there. The direction of polarization of the beams, corresponding to the two columns on the left is upward and to the left as represented by the so directed arrows in the figure. The same general pattern is shown in FIG. 6 where the beams corresponding to the top two rows have polarization directions upward as shown by the vertical arrows there. The beams corresponding to the bottom two rows have polarization directions to the right as shown by the arrows there. A comparison of FIGS. 3 and 6 with FIGS. 5 and 4 is helpful to show that as each beam is shown in FIG. 4 gives rise to two beams (FIG. 5) with orthogonal polarization directions each at 45 degrees with respect to that of the originating beam, so does each beam in FIG. 6 give rise to like beams as shown in FIG. 3. It is further helpful to show that the angles of deflection go from the vertical to the 45 degree orientation in FIGS. 4 and 5 and in FIGS. 6 and 3, respectively.

For simplicity, four Wollaston prisms are illustrated and a single input beam is routed thereby along $2^n=2^4$ or sixteen separate angles. The beams in the several angles are focused by lens 11 into sixteen discrete positions on, for example, a photographic plate placed in the image plane. This final disposition of the beams on that plate is as shown in FIG. 1.

For practical applications of the device of FIG. 1, it is advantageous for the beams of light to be resolvable by lens 11 into an array of equally spaced images. To this end, the angles δ between the component crystals in successive Wollaston prisms vary such that the prism P1 provides unit deflection of incident light beams, prism P2 provides $\sqrt{2}$ units of deflection, prism P3 provides two units of deflection, prism P4 provides $2\sqrt{2}$ units of deflection, and so forth. That this successive increase in deflection provides equal spacings of the output beams is appreciated from a consideration of the triangle formed between the three top arrows in FIG. 3. If the arrows in the rows and columns are spaced apart equal distances D, adjacent arrows along a diagonal are spaced $D\sqrt{2}$ apart. The most practical way to achieve the changes in the angle δ is to provide Wollaston prisms which are successively thicker to correspond to the desired angle. Wollaston prisms with suitable angles δ are available commercially. If the angles δ of the prisms are equal, more than one beam will terminate at particular positions in the image plane. Consequently, fewer than $2^n$ beams are provided by $n$ prisms and the intensities of the images produced vary.

A device as shown in FIG. 1, including eight Wollaston prisms two centimeters by two centimeters with fixed orientations in accordance with this invention, produced 256 like images of like intensity and substantially free of distortion. The first four prisms were of quartz; the second four were of calcite. The angle of deflection between the output beams provided by each of the prisms varied from 30 minutes for the first crystal to four degrees for the last in successive step (30 minutes, one degree, two degrees, four degrees) to provide the described relationship between the successive angles δ. A lens was employed to provide discrete positions for the images.

Although the invention is described in terms of Wollaston prisms with a particular structure and arrangement of orientations, it is to be understood that other prisms may be used exclusively or in combination with Wollaston prisms. Further, the orientations and the interfaces of the prisms may differ from those described. For example, the interface in a Wollaston prism may slope downward and to the rear face of the Wollaston prism rather than upward and to the rear as viewed in FIG. 2. Moreover, the Wollaston prism P1 may be oriented such that the beams are deflected by prism P1 to horizontally disposed positions rather than to perpendicularly disposed positions as shown in FIG. 4. Also, successive prisms may be at 45 degrees or 135 degrees clockwise or counterclockwise with respect to the next adjacent prisms. Successive prisms may be oriented 45 degrees further (clockwise or counterclockwise) providing a helical progression of orientations therefor. All such arrangements are contemplated within the scope of this invention and produce only a change in distribution of output beams (or images) as shown in FIG. 3 when used in the arrangement of FIG. 1.

On the other hand, the optical axis of each successive prism may be oriented 90 degrees with respect to the next adjacent prism and, for example, quarter-wave or half-wave (mica or quartz) plates placed between successive prisms to suitably change each plane polarized light beam from one prism to a beam having orthogonal polarization directions suitable for propagation by the next higher order prism in accordance with this invention. The optic axis of a quarter-wave plate is oriented at 45 degrees with respect to the optic axis of the prisms. The optic axis of a half-wave plate is oriented at 22½ degrees with respect to the optic axis of the next adjacent lower order prism. These materials are referred to as "rotators" hereinafter. Other suitable spacing materials such as Faraday rotators, optically active materials such as quartz, and sugar solutions also are suitable. These materials may or may not need fixed orientations as is appreciated by one skilled in the art. The 90 degree orientation of successive prisms is to provide both horizontal and vertical deflections in the device for providing an array of images.

FIG. 7 shows successively thicker Wollaston prisms P1', P2', P3', and P4' with alternate prisms oriented at 90 degrees with respect to the adjacent prisms. This orientation is illustrated by the position of the angles $\delta 1'$, $\delta 2'$, $\delta 3'$, and $\delta 4'$. The prisms are shown spaced apart by wave plates WP1, WP2, WP3 and WP4, respectively. The wave plates are rotated about the axis of the device to an angle with respect to the prisms as shown. Since FIG. 7 is intended to illustrate devices including either quarter or half-wave plates, the angle of orientation is shown at some unspecified acute angle representing 45 degrees and 22½ degress, respectively. The stack of prisms and wave plates is bounded by lenses 14' and 11' as shown in the figure. The various prisms and lenses are designated as are like elements shown in FIG. 1 to demonstrate the correspondence therebetween. The device shown in FIG. 7 may be substituted for the lens 14, prisms P1-P4 and lens 11, in the arrangement of FIG. 1. Only a change in the distribution of beams as shown in FIG. 3 results.

A light source compatible with this invention provides a beam of light having a band of wavelengths limited by the resolution desired at the image plane. In this connection Wollaston prisms, for example, deflect light at different wavelengths through different angles. Thus, for light including a band of wavelengths, dispersion is introduced at each prism. If the source is an optical maser or a sodium arc lamp, the input beam is at, essentially, a single wavelength and no problem arises. If the source is an ordinary light bulb, a filter limiting the range of wavelengths is used. Such filters are well known.

It is important to understand, at this juncture, that because a polarizing technique is utilized here as a means for providing multiple images, those multiple images are formed by light having different polarization directions. Those polarization directions, however, have negligible effect on work surfaces placed in the image plane. All that is required is that the wavelength and the intensity of light thereon are suitable to produce the desired results there. Specifically, different wavelengths and intensities may be required for providing different results in media (work surfaces) positioned at the image plane. For example, the exposure of a typical photographic plate with blue light, having wavelengths of about 5000 Angstrom units, requires intensities of about $10^{-10}$ watts per square centimeter for about 10 seconds. The polymerization of a photoresist solution with blue light requires intensities of about $10^{-6}$ watts per square centimeter for about 120 seconds. Photoetching with blue light requires one watt per square centimeter for about 10 minutes. Light of shorter wavelengths may be less intense or may be used for a shorter time. Sources are available to provide required wavelengths and intensities with the devices described.

It is to be understood that the specific embodiments of the invention described herein are merely illustrative and that numerous and other arrangements according to the principles of the invention may be devised by one skilled in the art without departing from the spirit and scope of this invention.

What is claimed is:

1. In combination, $n>2$ birefringent crystals arranged longitudinally along a common axis, said crystals being arranged in a passive organization and having orientations fixed with respect to one another such that a beam of substantially monochromatic polarized radiation transmitted through the crystals in the direction of said axis is deflected by each of said crystals simultaneously along a plurality of paths, and means directing a beam of monochromatic radiation along said axis into a first of said birefringent crystals.

2. A combination in accordance with claim 1 wherein said beam of radiation is light, and wherein said means directing comprises means for providing a beam of light, and means for forming a plurality of images thereof on an image plane.

3. A combination in accordance with claim 2 wherein said birefringent crystals are complex crystals.

4. A combination in accordance with claim 3 wherein said complex crystals are Wollaston prisms.

5. A combination in accordance with claim 4 wherein successive ones of said Wollaston prisms are oriented at 45 degrees with respect to one another.

6. A combination in accordance with claim 5 wherein said Wollaston prisms are successively thicker and are cemented together.

7. A combination in accordance with claim 3 wherein adjacent ones of said complex crystals are oriented at 90 degrees with respect to one another and spaced apart by polarization rotators having fixed orientations with respect to the polarization direction of light incident thereto.

8. A combination in accordance with claim 7 wherein said polarization rotators are quarter-wave plates.

9. A combination in accordance with claim 8 wherein said complex crystals have first and second orientations and each of said quarter-wave plates has a third orientation 45 degrees with respect to the orientations of said crystals.

10. A combination in accordance with claim 7 wherein said polarization rotators are half-wave plates.

11. A combination in accordance with claim 10 wherein said complex crystals have first and second orientations and each said half-wave plate has a third orientation 22½ degrees with respect to that of the next adjacent lower order crystal.

References Cited

UNITED STATES PATENTS 2,262,524  11/1941  Ball.

FOREIGN PATENTS 675,357  7/1952  Great Britain.
1,378,287  10/1964  France.
101,097  6/1937  Australia.

DAVID SCHONBERG, Primary Examiner.

PAUL R. MILLER, Assistant Examiner.

US. Cl. X.R.

350—147, 150